United States Patent Office 2,806,808
Patented Sept. 17, 1957

2,806,808

SOLDERING FLUXES

Peter Siegfried Muetzel, Cheshunt, England

No Drawing. Application February 16, 1953,
Serial No. 337,217

3 Claims. (Cl. 148—23)

This invention relates to a fluxing composition for use in the manufacture of a solder paste or paint, i. e. a viscous paint-like mixture containing powdered or granulated solder and a fluxing composition comprising a flux and a gum for keeping the particles of the heavy metal of the solder in suspension. An object of the present invention is the production of greatly improved fluxing compositions; another object of the present invention is the production of solder paints or pastes containing the said improved fluxing compositions.

In order to secure good results and to minimise the possibility of leaving bare, unsoldered or only bridged areas, a solder paint or paste should be capable of:

(1) Removing oxides and dirt;
(2) Preventing the formation of oxides, whilst the solder is being fused, and alloying it to the surface to which it is applied;
(3) Removing grease;
(4) Being spread, even over a greasy surface, rather than becoming lumpy, and of penetrating the surface treated, and
(5) Drying quickly after application.

It has been found that two factors are essential for giving a solder paint or paste the above properties. These are:

(1) That the particles of solder should be kept in suspension, even if the paint or paste is slightly diluted, as when it is used for spraying purposes, and
(2) That the particles of solder should be wetted throughout the paint or paste in order that they should be prevented from sticking together and forming lumps.

According to the invention, in order to produce a solder paint or paste having the aforesaid desirable properties, the fluxing composition consists of gum tragacanth for keeping the particles of the soldering metal in suspension and a wetting agent that consists of at least one member of the following group of compounds: a polyethylene oxide derivative of lauric acid, lauryl sulphate neutralized with ammonia, and an alkylated phenol-ethylene oxide containing a polyethylene glycol chain.

The following example gives the composition in percentages by weight of a liquid fluxing composition according to the invention and of the solder paste or paint containing the said fluxing composition, and shows suitable ranges of percentages of the various ingredients and the best percentages of the ingredients:

|  | Range of percentage | Best percentage |
|---|---|---|
| Gum tragacanth | 0.5 to 2.5 | 1.75 |
| Methylated spirit | 1.5 to 4.5 | 3.75 |
| Water | 20 to 50 | 34.50 |
| Ammonium chloride | 4 to 10 | 6.25 |
| Zinc chloride | 30 to 60 | 51.25 |
| Organic wetting agent | 0.1 to 20 | 2.5 |

With regard to the best percentages set out above, the figure of 2.5% for the organic wetting agent applies particularly to lauryl sulphate neutralised with ammonia, and, so far as the other examples of organic compounds as wetting agents listed previously are concerned, those numbered (1) and (3) have a best percentage within the range 2.5% to 3%.

20 percent by weight of the above liquid flux composition together with 80 percent by weight of the soldering metal give a solder paint or paste having the aforesaid advantages.

I claim:

1. A liquid flux composition composed as follows:

Percent by weight
Gum tragacanth _____ 0.5 to 2.5
Methylated spirit _____ 1.5 to 4.5
Water _____ 20 to 50
Ammonium chloride _____ 4 to 10
Zinc chloride _____ 30 to 60
Wetting agent consisting of at least one member of the following group of compounds: a polyethylene oxide derivative of lauric acid, lauryl sulphate neutralized with ammonia, and an alkylated phenol-ethylene oxide containing a polyethylene glycol chain _____ 0.1 to 20

2. A liquid flux composition composed as follows:

Percent by weight
Gum tragacanth _____ 1.75
Methylated spirit _____ 3.75
Water _____ 34.50
Ammonium chloride _____ 6.25
Zinc chloride _____ 51.25
Lauryl sulphate neutralized with ammonia _____ 2.5

3. A soldering composition consisting of soldering metal and a flux according to claim 2.

References Cited in the file of this patent
UNITED STATES PATENTS

| 804,664 | Leisel | Nov. 14, 1905 |
| 812,494 | Hussey | Feb. 13, 1906 |
| 1,004,847 | Brach | Oct. 3, 1911 |
| 2,493,372 | Williams | Jan. 3, 1950 |
| 2,508,501 | Di Gulio | May 23, 1950 |
| 2,547,771 | Pessel | Apr. 3, 1951 |
| 2,553,226 | Williams | May 15, 1951 |